United States Patent
Rothman et al.

(10) Patent No.: US 8,015,105 B2
(45) Date of Patent: Sep. 6, 2011

(54) METHODS AND SYSTEMS FOR PROVIDING STRUCTURED LOAN COMMITMENT TRANSACTIONS

(75) Inventors: Daniel J. Rothman, New York, NY (US); P. Thiaga Rajan, Jersey City, NJ (US)

(73) Assignee: Barclays Capital Inc., New York, NY (US)

( * ) Notice: Subject to any disclaimer, the term of this patent is extended or adjusted under 35 U.S.C. 154(b) by 313 days.

(21) Appl. No.: 11/414,108

(22) Filed: Apr. 28, 2006

(65) Prior Publication Data

US 2006/0253386 A1    Nov. 9, 2006

Related U.S. Application Data

(60) Provisional application No. 60/676,087, filed on Apr. 28, 2005, provisional application No. 60/686,547, filed on Jun. 1, 2005.

(51) Int. Cl.
    *G06Q 40/00*    (2006.01)
(52) U.S. Cl. .......................................... 705/38; 705/35
(58) Field of Classification Search ................ 705/38, 705/35
    See application file for complete search history.

(56) References Cited

U.S. PATENT DOCUMENTS

| | | | |
|---|---|---|---|
| 6,304,858 B1 * | 10/2001 | Mosler et al. | 705/37 |
| 7,565,316 B1 * | 7/2009 | Amin et al. | 705/37 |
| 2001/0044771 A1 * | 11/2001 | Usher et al. | 705/37 |
| 2002/0111891 A1 * | 8/2002 | Hoffman et al. | 705/36 |
| 2004/0030638 A1 * | 2/2004 | Dwin | 705/38 |
| 2004/0230507 A1 * | 11/2004 | Davidovitch et al. | 705/35 |
| 2005/0234797 A1 * | 10/2005 | Schwartz | 705/36 |
| 2006/0143099 A1 * | 6/2006 | Partlow et al. | 705/35 |
| 2006/0282356 A1 * | 12/2006 | Andres et al. | 705/35 |

OTHER PUBLICATIONS

Lynch, Thomas E. (1996). Interest rate swaps. The Internal Auditor, 53(4), 54. Retrieved Jun. 9, 2011.*

* cited by examiner

*Primary Examiner* — Charles Kyle
*Assistant Examiner* — Kito R Robinson
(74) *Attorney, Agent, or Firm* — Morgan Lewis & Bockius LLP

(57) ABSTRACT

In one aspect, the invention comprises entering into an agreement with a borrower to provide a loan of a specified amount on a specified date, wherein the agreement further specifies a fixed rate and a spread; and on the specified date specifying whether the borrower must pay a fixed coupon at the fixed rate or pay a floating coupon based on the spread. In another aspect, the invention comprises an agreement between a lender and a borrower whereby the lender provides to the borrower a loan of a specified amount on a specified date; a fixed rate and a spread are specified; and the borrower receives the specified amount on the specified date, and during the term pays, at lender's option to be specified on the specified date, either a fixed coupon at the fixed rate or a floating coupon at a floating rate based on the spread.

18 Claims, 6 Drawing Sheets

METHODS AND SYSTEMS FOR PROVIDING STRUCTURED LOAN COMMITMENT TRANSACTIONS

CROSS-REFERENCE TO RELATED APPLICATIONS

This application claims the benefit of U.S. Provisional Application No. 60/676,087, filed Apr. 28, 2005, and the benefit of U.S. Provisional Application No. 60/686,547, filed Jun. 1, 2005. The entire contents of those two provisional applications are incorporated herein by reference.

SUMMARY

In the corporate context, a credit spread is the difference between the yield on the debt securities of the corporation and the yield of similar maturity Treasury debt securities.

Corporations and other borrowers would like to find a way to lock in their current credit spreads without currently taking in any new funding.

Most companies' credit spread curves are generally upward sloping. This means that future credit spreads are predicted to be higher than current spreads. Thus the spread a client would expect to be able to lock in would be higher than current levels.

Generally, an entity cannot lock in its own spreads in the derivative markets—that raises a number of insider trading issues. However, an entity can issue or take out a (funded or unfunded) loan and effectively lock in its spreads.

Embodiments of the present invention enable an entity to hedge its own credit spread. Also, interest rate optionality may be used to hedge an entity's credit spread at better levels than their forward spread—in fact, at their current spread.

In one aspect, the invention comprises a method comprising: (a) entering into an agreement with a borrower to provide a loan of a specified amount on a specified date, wherein the agreement further specifies a fixed rate and a spread; and (b) on the specified date, providing the specified amount to the borrower, and specifying whether the borrower must pay a fixed coupon on the specified amount at the fixed rate or pay a floating coupon on the specified amount at a floating rate based on the spread.

In various embodiments: (1) the floating rate is a LIBOR rate plus the spread; (2) the LIBOR rate is three-month LIBOR; (3) the loan is less than 10% of the borrower's total debt outstanding; (4) the method further comprises forming a trust operable to provide the loan to the borrower; (5) the trust is operable to pay commitment fees to one or more banks prior to the specified date as compensation for a commitment from the one or more banks to fund the loan; (6) the trust is operable to pay interest payments on the loan to one or more banks after the specified date; (7) the trust is operable to receive the loan from one or more banks at or near the specified date and to transfer the loan to the borrower on the specified date; and (8) the interest payments are based on a LIBOR rate plus a specified number of basis points of the loan.

In another aspect, the invention comprises a method comprising the steps of: (a) entering into an agreement with a lender to receive a loan of a specified amount on a specified date, wherein the agreement further specifies a fixed rate and a spread; and (b) on the specified date, receiving the loan, and receiving information specifying whether a fixed coupon on the specified amount at the fixed rate or a floating coupon on the specified amount at a floating rate based on the spread must be paid on the loan.

In various embodiments: (1) the floating rate is a LIBOR rate plus the spread; (2) the LIBOR rate is three-month LIBOR; (3) the loan is less than 10% of total debt outstanding; (4) the method further comprises communicating with a trust operable to provide the loan; (5) the trust is operable to pay commitment fees to one or more banks prior to the specified date as compensation for a commitment from the one or more banks to fund the loan; (6) the trust is operable to pay interest payments on the loan to one or more banks after the specified date; (7) the trust is operable to receive the loan from one or more banks at or near the specified date and, further comprising receiving the loan from the trust on the specified date; and (8) the interest payments are based on a LIBOR rate plus a specified number of basis points of the loan.

In another aspect, the invention comprises an agreement between a lender and a borrower, comprising terms whereby: (a) the lender provides to the borrower a loan of a specified amount and a specified term on a specified date; (b) a fixed rate and a spread are specified; and (c) the borrower receives the specified amount on the specified date, and during the term pays, at lender's option to be specified on the specified date, either a fixed coupon on the specified amount at the fixed rate or a floating coupon on the specified amount at a floating rate based on the spread.

In various embodiments: (1) the floating rate is a LIBOR rate plus the spread; (2) the LIBOR rate is three-month LIBOR; (3) the loan is less than 10% of the borrower's total debt outstanding; (4) a trust is operable to provide the loan to the borrower; (5) the trust is operable to pay commitment fees to one or more banks prior to the specified date as compensation for a commitment from the one or more banks to fund the loan; (6) the trust is operable to pay interest payments on the loan to one or more banks after the specified date; (7) the trust is operable to receive the loan from one or more banks at or near the specified date and to provide the loan to the borrower on the specified date; (8) the interest payments are based on a LIBOR rate plus a specified number of basis points of the loan.

DETAILED DESCRIPTION

The Structured Loan Commitment (comprised in at least one embodiment of the subject invention) provides a client with a solution that addresses the above concerns in an accounting-friendly way.

Figure 1:
FIG. 1 depicts a timeline for a preferred embodiment.

Referring to FIG. 1: at $t_0$ (t=0), Lender and Corp enter a Structured Loan Commitment agreement. In this agreement, a fixed rate F and a spread S are identified.

Figure 2:
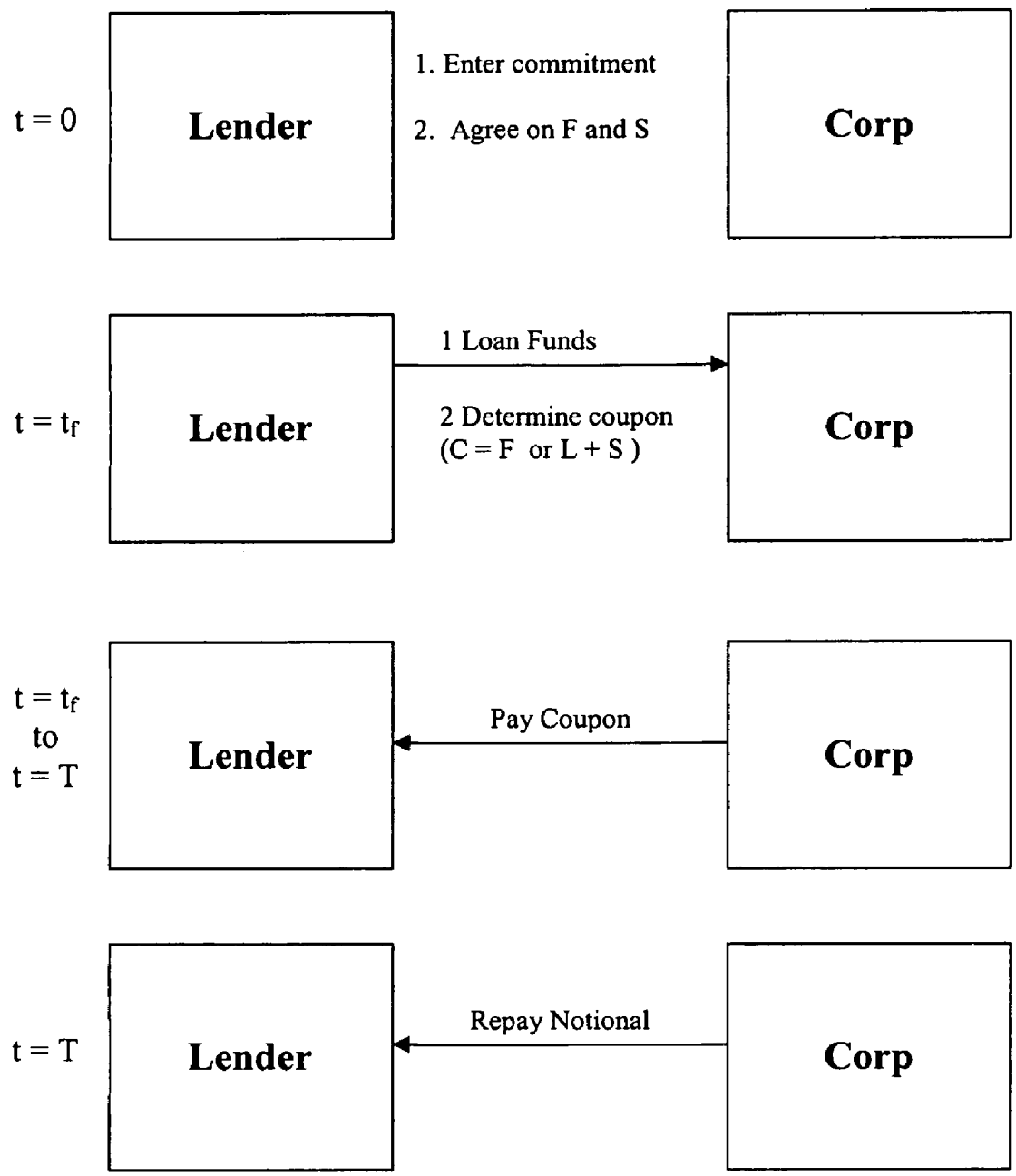
FIG. 2 depicts preferred structure for one embodiment.

At $t=t_f$, the loan will fund. At that time, Lender will inform Corp whether Lender will pay a fixed coupon or a floating coupon. If fixed, the coupon will be F. If floating, the coupon will be Libor+S. See FIG. 2.

Time t=0 preferably occurs immediately following a public announcement (10K or 10Q) such that the client (Corp) is not in possession of material non-public information. The total notional must be less than 10% and preferably less than 5% of the client's total debt outstanding, so that this loan is not material relative to the client's total amount of debt and thus does not have to be made public. This enables hedging to occur, since the existence of the loan will not have an impact on the market spreads of the client.

There is value for Lender in having the choice between a fixed or floating coupon. This value is used to offset the higher forward credit spreads and bring them down to current spread levels. It is also used to offset the cost to Lender of exposure to the client during the initial period.

Since the initial period is unfunded, the client incurs no cost during this time. Since F and S both include a predetermined credit spread, the client has successfully locked in its spreads at current levels.

Structured Forward Loan Agreement—Example Term Sheet

Result: Banks have monetized their willingness to lend longer, and are paid for the forward loan. They have allocated cash to a funded loan instrument, and are paid a full floating coupon of Libor plus spread during the funded period.

Mechanics: Unfunded Initial Period

Figure 3:
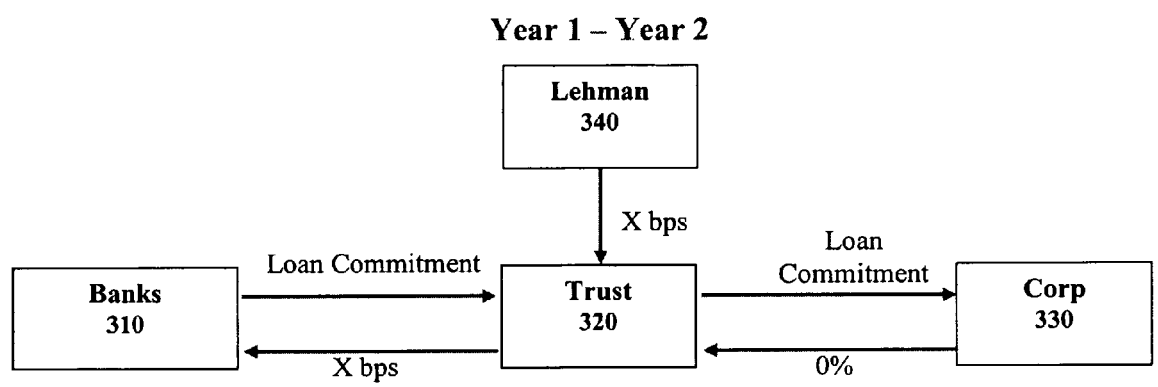
FIG. 3 depicts preferred payment obligations for a preferred embodiment during an unfunded period.

Banks receive a commitment fee for the forward loan (see FIG. 3). Banks 310 enter a loan commitment to a trust 320; the loan will fund at time $t_f$. Banks 310 receive a commitment fee of X bps from trust 320 (which preferably is funded by a party supplying the product—in FIG. 3, this is Lehman 340) during the unfunded initial period.

Mechanics: Funded Second Period

Figure 4:
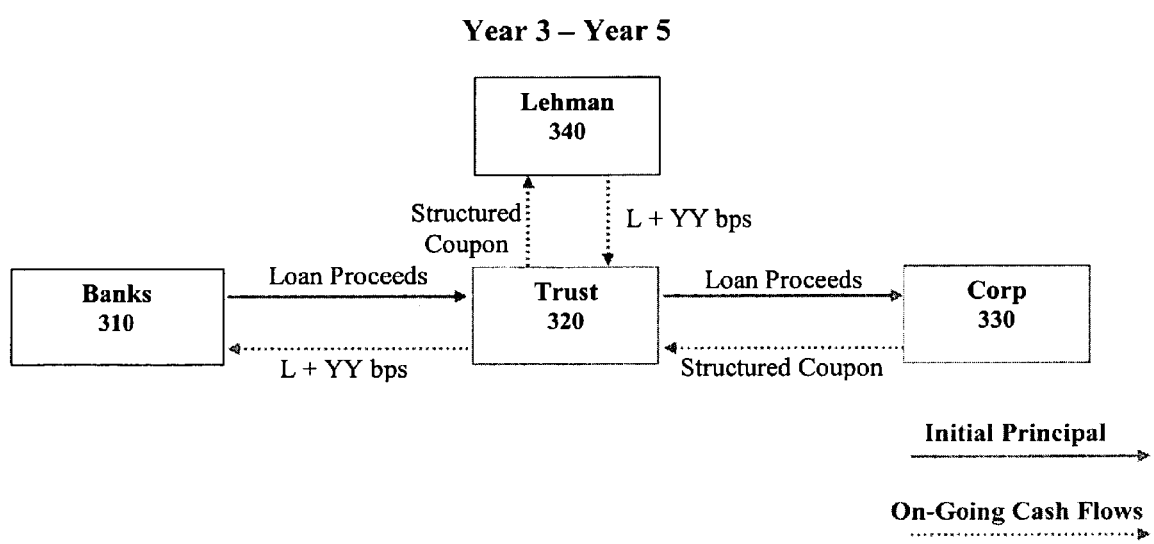
FIG. 4 depicts preferred payment obligations for a preferred embodiment during a funded period.

Standard Loan—Floating Coupon received for cash loan (see FIG. 4). At the funding date $t_f$, Banks 310 fund the loan to trust 320, and the trust 320 will fund the loan to the Corporate 330—this provides certainty and timing of funding. Banks 310 receive the floating coupon for the duration of the period.

| | |
|---|---|
| Transaction: | The parties agree that Lender shall lend funds to the Borrower, such funding to be made one year following the Effective Date and Borrower shall pay Lender interest on such funds at the Fixed Rate or Floating Rate at the sole discretion of the Lender |
| Trade Date: | TBD |
| Effective Date: | TBD |
| Borrowing Commitment Date: | One year following the Effective Date |
| Termination Date: | Five years following the Effective Date |
| Borrower: | X Corporation, which shall be rated at least investment grade on the Trade Date |
| Lender: | {entity} |
| Borrowing Commitment: | On the Borrowing Commitment Date, Lender shall deliver to Borrower the Commitment Amount |
| Commitment Amount: | USD [     ] |
| Interest Rate: | Fixed Rate or Floating Rate, to be elected by Lender at its sole discretion and notified to Borrower at least one day prior to the Borrowing Commitment Date; provided, however, that Fixed Rate and Floating Rate shall be determined on the Trade Date |
| Fixed Rate: | [ ] % |
| Floating Rate: | 3-Month LIBOR + Floating Rate Spread |
| Floating Rate Spread: | [ ] % |
| Interest Payment Date: | Quarterly, in arrears |
| Documentation: | Standard form of Credit Agreement to be executed by Borrower and Lender on the Effective Date which agreement to contain representations and warranties and covenants consistent with those for a North American investment grade borrower |

Lender can hedge its credit exposure to the Borrower (Corp) at or near the time of entering into the Forward Loan Agreement by, for example, entering into one or more of the following instruments with third parties: loan participations, total return swaps, credit default swaps, and other similar credit derivative instruments. Lender can hedge its interest rate exposures by, for example, establishing positions in one or more of the following instruments: interest rate swaps, interest rate options, interest rate or U.S. Treasury futures contracts, and/or U.S. Treasury securities.

Forward Loan Commitment Overview

Corp can lock in the credit cost of a future financing event today through the loan market:

Situation: Banks currently issue revolvers and roll them at the end of every year; they only receive a commitment fee, and don't monetize willingness to lend longer.

Structure: Banks enter a commitment to lend at a specific time $t_f$ in the future; they receive a commitment fee (X bps) during the unfunded period, and they receive a full floating coupon during the funded period. See FIGS. 3 and 4. The Banks are paid for their appetite to lend out the curve.

Figure 5:
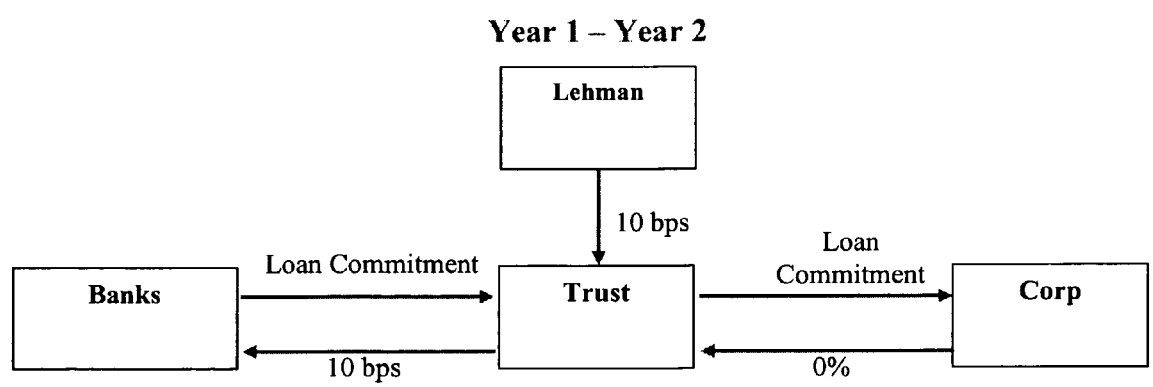
FIG. 5 depicts exemplary payment obligations for a preferred embodiment during an unfunded period.
Figure 6:
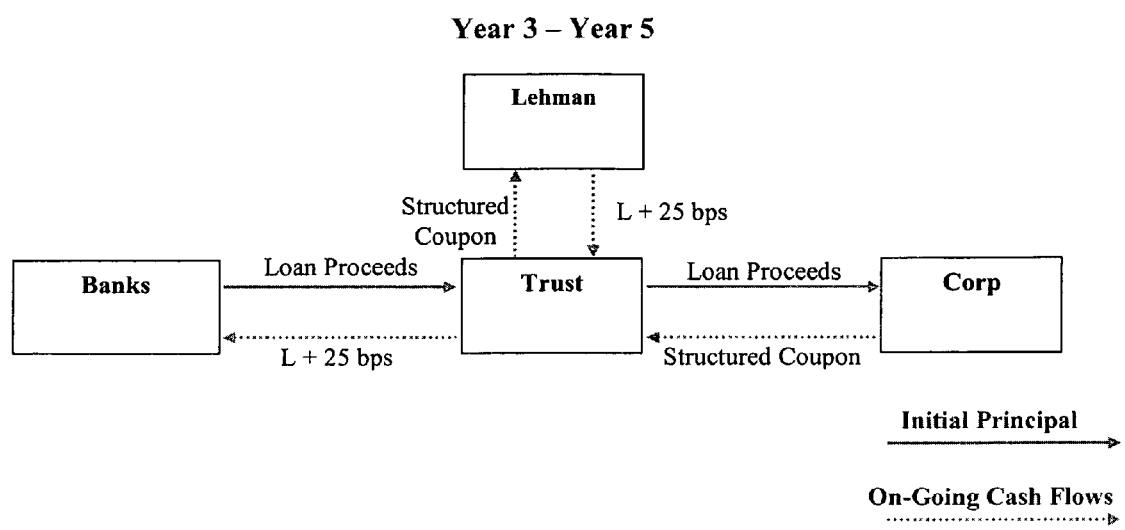
FIG. 6 depicts exemplary payment obligations for a preferred embodiment during an unfunded period.

Example: Banks receive 10 bp during the unfunded period (see FIG. 5) and L+25 bp during the funded period (see FIG. 6).

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases. Hedging calculations for the hedging strategies described above preferably are performed using one or more computers, using either custom or off-the-shelf software. And calculations related to the decision by Lender to select F or L+S preferably are performed using a computer.

We claim:

1. A system comprising:
memory operable to store at least one program; and
at least one processor communicatively coupled to the memory, in which the at least one program, when executed by the at least one processor, causes the at least one processor to:
access data regarding a loan agreement entered into on a loan agreement date comprising a specified loan amount, a fixed rate, a credit spread, and a floating rate, wherein said floating rate comprises said credit spread;
process data regarding a selection made after said loan agreement date of one of said fixed rate and said floating rate from said loan agreement to be an interest rate for interest payments on said specified loan amount; and
communicate information specifying said interest rate for said specified loan amount.

2. A system as in claim 1, wherein said floating rate is a LIBOR rate plus said spread.

3. A system as in claim 2, wherein said LIBOR rate is three-month LIBOR.

4. A system as in claim 1, wherein said specified loan amount is less than 10% of total debt outstanding.

5. A system as in claim 1, wherein a trust provides said loan.

6. A system as in claim 5, wherein said trust is operable to electronically pay commitment fees to one or more banks prior to said specified loan amount being provided to a borrower, as compensation for a commitment from said one or more banks to fund said loan.

7. A system as in claim 5, wherein said trust is operable to electronically pay interest payments on said loan to one or more banks after said specified loan amount is provided to said borrower.

8. A system as in claim 5, wherein said trust is operable to electronically receive said loan from one or more banks at or near a specified date and, further comprising electronically transferring said loan to said borrower on said specified date.

9. A system as in claim 7, wherein said electronically-paid interest payments are based on electronically-received data comprising a LIBOR rate plus a specified number of basis points of said loan.

10. A system comprising:
memory operable to store at least one program; and
at least one processor communicatively coupled to the memory, in which the at least one program, when executed by the at least one processor, causes the at least one processor to:
access and process data regarding a loan agreement entered into on a loan agreement date comprising a specified loan amount, a fixed rate, a credit spread, and a floating rate, wherein said floating rate comprises said credit spread;
wherein said loan further specifies that one of: said fixed rate or said floating rate will be selected, after the loan agreement date, to be an interest rate for interest payments on said loan;
store data regarding said specified loan amount, said fixed rate, said credit spread, and said floating rate; and
communicate said stored data regarding said specified loan amount, said fixed rate, said credit spread, and said floating rate.

11. A system as in claim 10, wherein said floating rate is a LIBOR rate plus said spread.

12. A system as in claim 11, wherein said LIBOR rate is three-month LIBOR.

13. A system as in claim 10, wherein said specified loan amount is less than 10% of said borrower's total debt outstanding.

14. A system as in claim 10, wherein a trust provides said loan to said borrower.

15. A system as in claim 14, wherein said trust is operable to electronically pay commitment fees to one or more banks prior to said specified loan amount being provided to said borrower, as compensation for a commitment from said one or more banks to fund said loan.

16. A system as in claim 14, wherein said trust is operable to electronically pay interest payments on said loan to one or more banks after said specified loan amount is provided to said borrower.

17. A system as in claim 14, wherein said trust is operable to electronically receive said loan from one or more banks at or near a specified date and to electronically transfer said loan to said borrower on said specified date.

18. A system as in claim 16, wherein said electronically-paid interest payments are based on electronically-received data comprising a LIBOR rate plus a specified number of basis points of said loan.

* * * * *